United States Patent [19]
Liu

[11] Patent Number: 5,318,266
[45] Date of Patent: Jun. 7, 1994

[54] DRINK HOLDER

[76] Inventor: Hui-Long Liu, No. 2-4, Shih Tzyy Kuoo, Shan Shahng Shiang, Tainan Shien, Taiwan

[21] Appl. No.: 52,617

[22] Filed: Apr. 27, 1993

[51] Int. Cl.$^5$ ............................................... A47K 1/00
[52] U.S. Cl. ............................... 248/311.2; 248/316.5; 248/293
[58] Field of Search ............... 248/311.2, 316.5, 313, 248/231.5, 289.1, 293, 309.1; 197/188, 191, 194

[56]         References Cited
         U.S. PATENT DOCUMENTS

| | | | |
|---|---|---|---|
| 1,073,679 | 9/1913 | Haussman | 248/316.5 |
| 1,592,161 | 7/1926 | Schultz | 248/316.5 X |
| 4,586,687 | 5/1986 | Ziaylek, Jr. | 248/316.5 X |
| 4,828,211 | 5/1989 | McConnell et al. | 248/311.2 |
| 4,887,784 | 12/1989 | Kayali | 248/278 X |
| 5,072,909 | 12/1991 | Huang | 248/311.2 |
| 5,167,392 | 12/1992 | Henricksen | 248/311.2 |

*Primary Examiner*—Karen J. Chotkowski

[57]         ABSTRACT

A diametrically adjustable and collapsible holder for drinking vessels having a vertical position plate, two semi-round arms fixed with an arm holding base pivotally connected with the position plate, and a plate cap also pivotally with the position plate to be swung open for 90° or closed together relative to each other. The semi-round arms define a round hole for a drinking vessel such as a cup or a can to fit therein and to sit on an inner surface of the plate cap. The semi-round arms are provided with gear teeth to engage each other to enable both arms to move inward or outward to enlarge or contract the hole they define.

1 Claim, 3 Drawing Sheets

DRINK HOLDER

BACKGROUND OF THE INVENTION

A conventional collapsible holder for drinking vessels shown in FIGS. 1 comprises a vertical position plate 10, a holding plate 11 pivotally connected with an upper inner side of the position plate 10 and a plate cap 12 pivotally connected with a lower inner side of the position plate 10 and two plate springs 13, 14 with an upper sloped portion and a lower sloped portion fixed vertically spaced apart in parallel on an inner surface of the position plate. Then the holding plate 11 and the plate cap 12 are collapsed relative to the position plate 10 to become flat or to be swung open for 90° to each other for holding a drinking vessel put through down the hole in the holding plate 11 to sit on an inner surface of the plate cap 12. But the size of the hole for a drinking vessel is constant, not adjustable, and inconvenient.

SUMMARY OF THE INVENTION

This invention has been devised to offer a diametrically adjustable and collapsible holder for drinking vessels, having two semi-round arms to define a hole for a drinking vessel, and the diameter of the hole is adjustable by moving the two semi-round arms inward or outward by means of gear teeth engaging each other provided on half around round rear ends of the two semi-round arms to suit various sizes of drinking vessels.

DETAILED DESCRIPTION OF THE INVENTION

Figure 1:
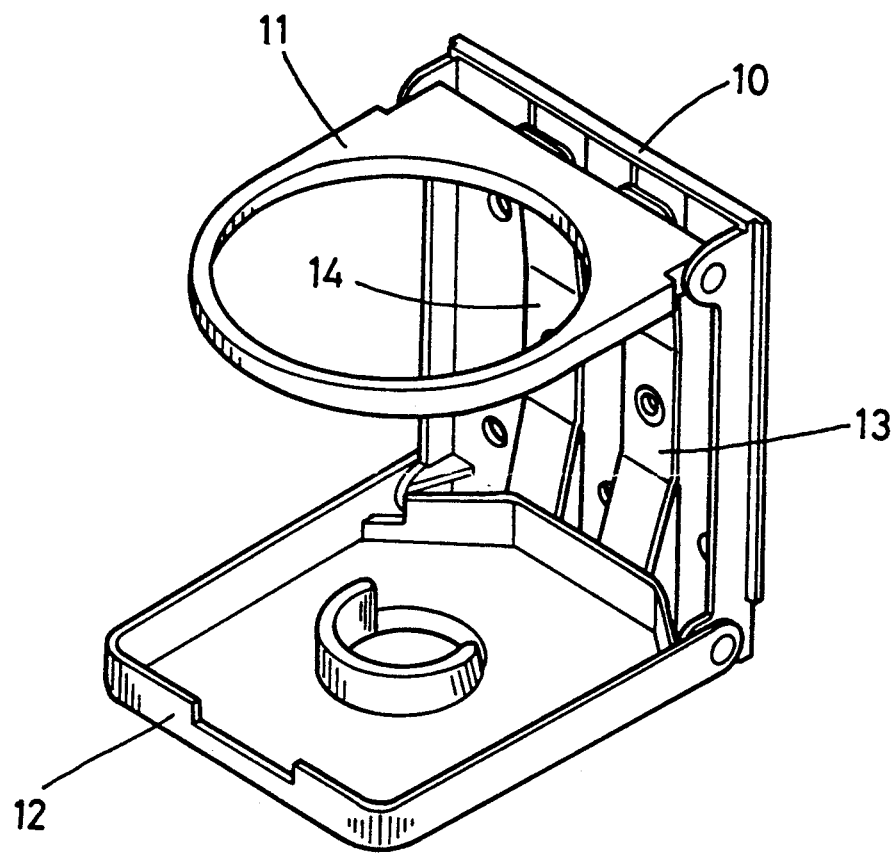
FIG. 1 is a perspective view of a conventional collapsible holder for drinking vessels.
Figure 2:
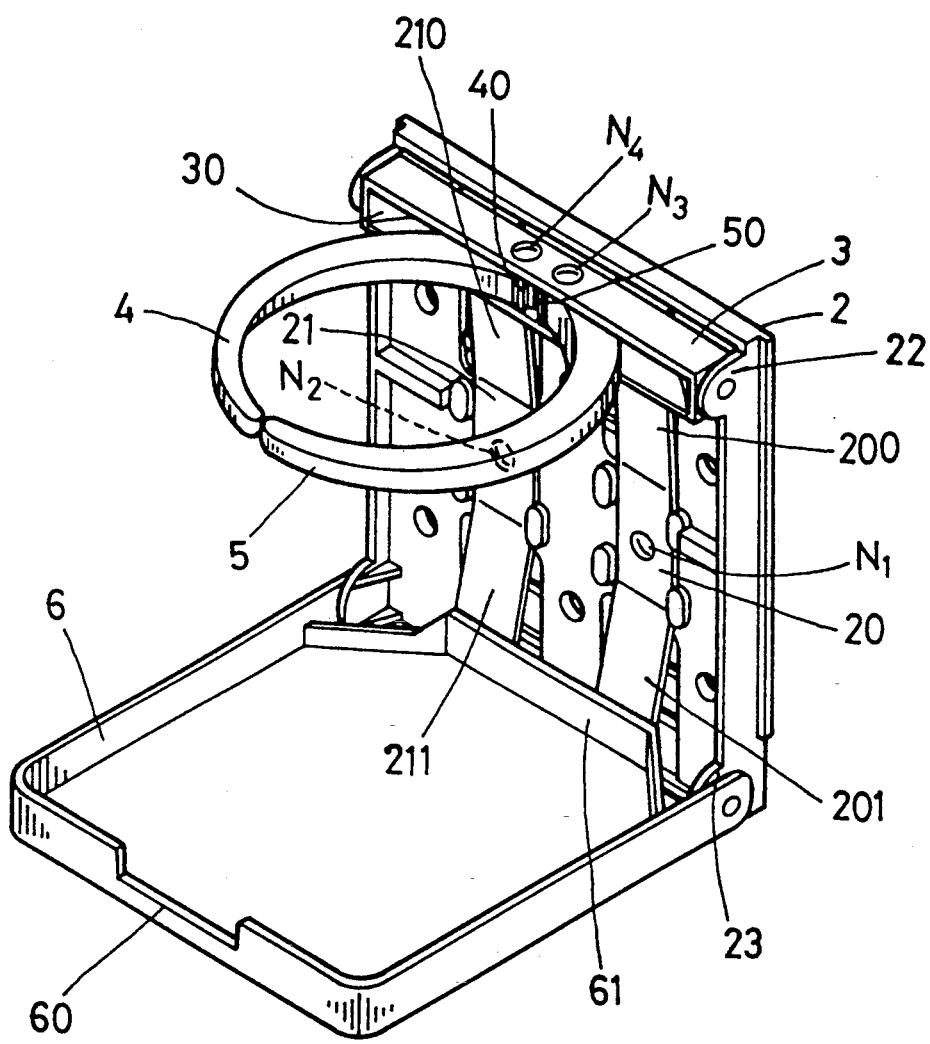
FIG. 2 is a perspective view of a diametrically adjustable collapsible holder for drinking vessels in the present invention.

A diametrically adjustable and collapsible holder for drinking vessels in the present invention, as shown in FIG. 2, comprises a position plate 2, an arm holding base 3, two semi-round arms 4, 5 and a plate cap 6 pivotally connected together collapsible.

The position plate 2 is preferably shaped square, has two rectangular plate springs 20, 21 riveted parallel vertically on an inner surface with rivets N1, N2. The plate springs 20, 21 respectively have upper sloped portions 200, 210, and lower sloped portions 201, 211. The position plate 2 also has two upper connecting portions 22, 22 and two lower connecting portions 23, 23 extending inward from a left and a right side edge.

The arm holding base 3 is pivotally connected with the upper connecting portions 22, 22 of the position plate 2, shaped like an elongage case with an open top and having a curved inner surface 30 in an inner side.

The semi-round arms 4, 5 are respectively shaped semi-round to define a round hole, having a thick rear end cut with gear teeth 40, 50 pinned pivotally in the intermediate portion of the arm holding base 3 with pins N3, N4.

The plate cap 6 is preferably shaped square as the position plate 2, having its rear side pivotally connected with the lower connecting portions 23, 23, having a long rectangular notch 60 in its front low side wall, an elongate block plate 61 provided on its rear side and urged by the lower ends of the sloped portions 201, 211 of the plate springs 20, 21.

In assembling, at first, the two plate springs 20, 21 are riveted firmly on the inner surface vertically and in parallel with the rivets N1, N2. Next, the two semi-round arms 4, 5 are pivotally fitted in the arm holding base 3 to contact its curved surface 30 with pins N3, N4, letting the gear teeth 40, 50 engage each other. Finally, the arm holding base 3 and the plate cup 6 are respectively connected pivotally with the upper connecting portions 22, 22 and the lower connecting portions 23, 23 of the position plate 2, with the upper ends of the upper sloped portions 200, 210 urging the arm holding base 3 and with the lower ends of the lower sloped portions 201, 211 of the plate springs 20, 21 urging the block plate 61, as shown in FIG. 2.

Figure 3:
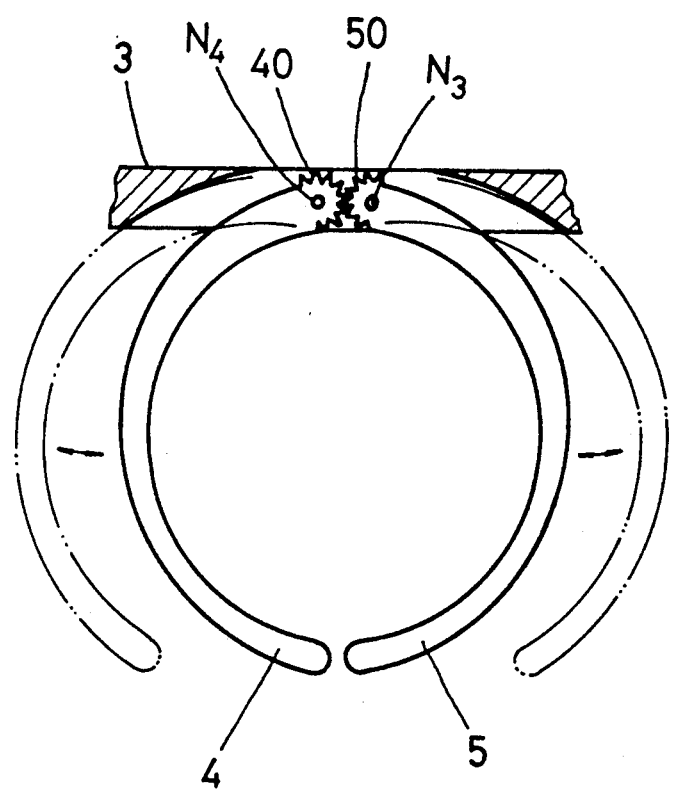
FIG. 3 is an upper view of holding arms of the diametrically adjustable and collapsible holder for drinking vessels in the present invention.

In using, the plate cap 6 is to be swung down for 90 from a collapsed condition, wherein the plate cap 6 is swung up and the semi-round arms 4, 5 are swung down with the arm holding base 3 as a pivot to lie near the inner surface of the position plate 2, to an open condition shown in FIG. 2. and then the block plate 61 is elastically urged by the lower sloped portions 201, 211 and the arm holding base 3 also is elastically urged by the upper sloped portion 200, 210 of the plate springs 20, 21, permitting the plate cap 6 and the arm holding base 3 with the arms 4, 5 are swung open quickly for 90°. So a drinking cup or can be put down through the hole defined by the two semi-round arms 4, 5, with its bottom secured on an inner surface of the plate cap 6. When the hole is too large or small, the two semi-round arms 4, 5 are moved inward or outward relative to each other by engagement of the gear teeth 40 and 50, enlarging or contracting the hole defined by the arms 4, 5 as shown in FIG. 3. Therefore, this holder is adjustable in the diameter in the diameter of hole defined by the arms 4, 5 to suit different sizes of drinking vessels, such as cups and cans.

What is claimed is:

1. An adjustable and collapsible holder for drinking vessels comprising:

a vertical position plate preferably square in shape and having as upper inner side pivotally connected to an arm holding base, a lower side pivotally connected to a rear side of a plate cap, two parallel rectangular plate springs fixed with rivets to an inner surface of the position plate, each said spring having an upper sloped portion to apply force to the arm holding base and a lower sloped portion to apply force to the plate cap;

the arm holding base being rectangular in shape and including two semi-round arms, the base further including an open top, the base being connected pivotally to the upper inner side of the position plate so as to swing through an arc of 90° to allow the semi-round arms to collapse to a lowered position against the vertical position plate, and to raise to a position perpendicular to the vertical position plate, the arms then being held in place by the upper sloped portion of the plate springs;

the semi-round arms each having a thick rear end pivotally connected to an inner intermediate portion of said arm holding base, the arms defining a circular opening through which a drinking vessel passes, each arm further including gear teeth on their rear ends so that the two arms are interengaged, the size of the opening formed by the arms thus being infinitely adjustable within the range of motion of the arms, the adjustment being accomplished by moving either of the arms;

a plate cap shaped similar to said position plate and pivotally connected at a rear side to said position plate so that the plate cap can move through a 90° arc so as to swing open to a position perpendicular to the position plate to act as a base for the drinking vessel to rest upon, and so as to swing up to a position against said position plate to cover the entire holder when the arms are lowered.

\* \* \* \* \*